United States Patent [19]

Phillips et al.

[11] 4,103,222

[45] Jul. 25, 1978

[54] PHASE DISPLACED MEASUREMENT OF CONTIGUOUS SPHERICAL BALLS

[75] Inventors: James Hugh Phillips; Curt Ludwig David; Michael James Rogers, all of Peterborough, England

[73] Assignee: The Newall Engineering Company, Ltd., England

[21] Appl. No.: 709,072

[22] Filed: Jul. 27, 1976

[30] Foreign Application Priority Data

Aug. 5, 1975 [GB] United Kingdom ............... 32724/75

[51] Int. Cl.² ............................................ G01R 33/00
[52] U.S. Cl. ..................................... 324/207; 324/208
[58] Field of Search ............. 324/34 R, 34 PS, 34 D, 324/41; 340/258 R, 258 C, 195, 196

[56] References Cited

U.S. PATENT DOCUMENTS

| | | | |
|---|---|---|---|
| 2,621,514 | 12/1952 | Waugh | 324/34 GT |
| 3,147,574 | 9/1964 | Pointe et al. | 324/34 PS |
| 3,883,796 | 5/1975 | Holt | 324/34 PS |

Primary Examiner—Rudolph V. Rolinec
Assistant Examiner—Michael J. Tokar
Attorney, Agent, or Firm—Mawhinney & Mawhinney & Connors

[57] ABSTRACT

A detector for measuring relative movement and/or displacement between two relatively movable members comprises a linear array of steel balls, or other suitable longitudinal element of which the magnetic permeability varies cylically in a longitudinal direction, mounted on one of the members, and a transducer on the other member. The transducer is arranged to produce a magnetic field through the balls, preferably across the line thereof, and includes at least two pick-up coils spaced along the line of balls for sensing the variation in the magnetic field due to the presence of the balls, so that the relative spacing of the pick-up coils and the balls enable, on production of the magnetic field, the generation by the pick-up coils of output signals denoting the relative movement between the two members.

4 Claims, 3 Drawing Figures

PHASE DISPLACED MEASUREMENT OF CONTIGUOUS SPHERICAL BALLS

This invention relates to a detector for measuring relative movement and/or displacement.

According to one aspect of the invention, there is provided a detector comprising a member (which may be a linear array of steel balls) exhibiting a cyclic spatial variation of magnetic permeability, and a transducer comprising means for producing a magnetic field through this member and two displaced pick-up coils for sensing phase-displaced variations in the magnetic field effected by the spatial variation of magnetic permeability to determine thereby the position of the spatial variation and hence the position of the member relative to the pick-up coils.

According to a second aspect of the invention, there is provided a detector comprising a plurality of regularly shaped elements of magnetic material which are periodically spaced along a path, and a transducer which is movable relative to said elements in a direction parallel to the path of said elements, said transducer including at least two spaced apart pairs of coils, each pair comprising a transmitter coil for producing a magnetic field across the path of the elements and a pick-up coil, the relative locations of the pairs of coils and the elements enabling, on energisation of the transmitter coils, the production by the pick-up coils of signals denoting the said relative movement.

The transducer may include a multiplicity of poles, i.e. pairs of coils, the relative positions of these poles being determined by the number of poles provided. In this instance, the transmitter coil of each pole is preferably supplied with a signal having a periodic waveform, the relationship between the phase of the signal supplied and that of the signal supplied to the transmitter coil of any other pole being directly related to their relative locations.

The elements may be balls, preferably spherical, which may be made of steel, and which are preferably placed side by side in contact along said path. The balls are preferably constrained so that they cannot move relative to each other, and may be housed in a container such as a tube or mounted on a support of non-magnetic material, so that the said path is straight.

In practice, the elements are connected to a first part of a machine of which the displacement relative to a second part of the machine due to relative movement therebetween is to be measured, and the transducer is mounted on the second part of the machine. Either of the parts of the machine may be stationary whilst the other one moves, or both may move in different directions or at different speeds, so long as there is some relative displacement in a direction parallel to the path of magnetic elements.

Reference will now be made to the accompanying drawings, which illustrate, by way of example, two embodiments of the invention and of which:

Figure 1:
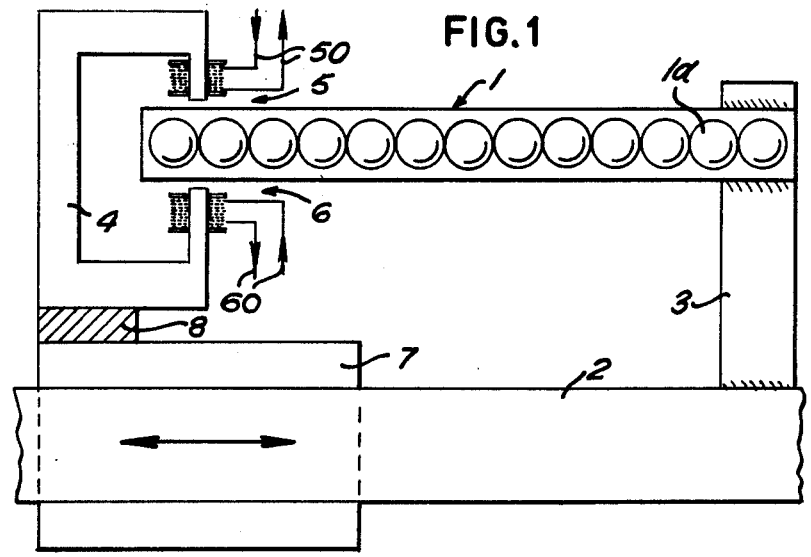
FIG. 1 illustrates diagrammatically one embodiment of the invention, showing one pair of coils only for clarity.

In FIG. 1, a ball container 1, of non-magnetic material, which may be tubular, is fixedly mounted to a part 2 of a machine by a link 3. A transducer comprising several pole pieces 4 (of which only one is shown for clarity), each pole piece 4 carrying a pair of coils comprising a transmitter coil 5 and a received or pick-up coil 6, the pole pieces 4 being fixedly connected to a second part 7 of the machine by a link 8. The parts 2 and 7 are relatively movable in the direction shown by the double-headed arrow and it is the relative displacement resulting from this relative movement which is to be measured. The container 1 houses a plurality of steel spherical balls 1a, arranged side by side in contact with each other in a straight line which is parallel to the direction of relative movement of parts 2 and 7. The coils 5 and 6 are placed on opposite sides of the line of balls 1a, and the pole pieces 4 aligned so as to execute motion relative to the line of balls 1a in a direction parallel to that line when the parts 2 and 7 move relative to each other. It is immaterial whether part 2 is stationary and part 7 moves, or vice versa, or whether both parts move in opposite directions and/or at different speeds, so long as relative displacement occurs parallel to the line of balls 1a.

The transducer employs a number of poles which are periodically spaced along the lines of balls 1a, the relative positions of these poles being determined by the number of poles used. Each transmitter coil is supplied via lines 50 with a signal of periodic waveform, e.g. sinusoidal, rectangular etc., the phase relationship of which is directly related to the pitch displacement of the appropriate coil. This signal produces a magnetic field between the transmitter coil 5 and the receiver coil 6, which is affected by the relative movement of the balls 1a between the two coils. The resulting variation in the magnetic field produces corresponding variations in the signal induced in the receiver coil 6. Thus, when the outputs in lines 60 from all the receiver coils are summed, the resultant signal, after filtering where necessary, is a constant amplitude sinusoidal wave signal whose phase is directly proportional to the relative displacement between parts 2 and 7 due to relative movement therebetween. The resultant signal, after suitable processing, is displayed on a readout panel in digital form which can be connected to a printer for a permanent record to be made.

Figure 2:
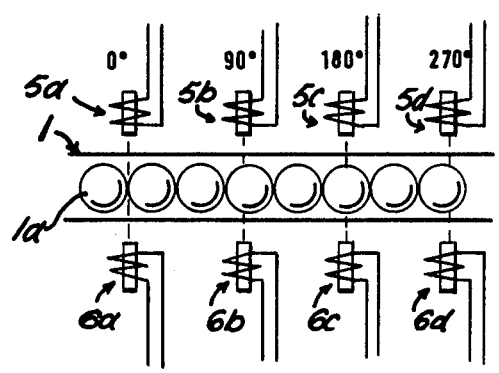
FIG. 2 illustrates diagrammatically the arrangement of four pairs of coils in the measuring device shown in FIG. 1.

An example of a four pole arrangement is shown in FIG. 2, where the adjacent poles are spaced by $(2d + d/4)$ where $d$ is the diameter or pitch of each ball 1a, so that the phases of the signals fed to transmitter coils 5b, 5c and 5d relative to that of the signal fed to transmitter coil 5a are 90°, 180° and 270° respectively, and the resultant signals in receiver coils 6a, 6b, 6c and 6d are summed as described above. It should be noted that it is possible for the same signal to be fed to all the transmitter coils 5a, 5b, 5c and 5d, shown in FIG. 2, any phase shift required due to the relative positions of the poles along the path being applied to the output signals from the respective receivers before they are summed.

Figure 3:
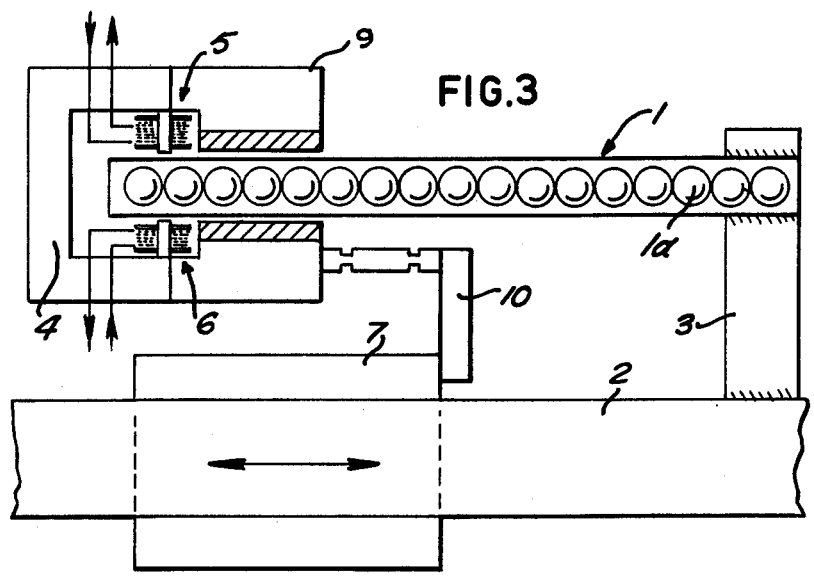
FIG. 3 illustrates diagrammatically a second embodiment of the invention, showing one pair of coils only for clarity.

FIG. 3 shows an alternative arrangement of the transducer and container 1 which facilitates the accurate aligning of one to the other. The container 1 is, as in the embodiment of FIG. 1, mounted on the part 2 by a link 3, and the arrangement and operation of the transducer with respect to the container 1 is likewise similar to that described for the embodiment of FIG. 1, the difference being that in this embodiment, the pole pieces 4 of the transducer are fixed to a carriage 9 which is mounted on container 1 for sliding motion therealong. The connection between the pole piece 4 and part 7 of the machine is provided by a flexible link 10, replacing the rigid link 8 shown in FIG. 1.

We claim:

1. A position detector comprising a first member, a plurality of identical steel balls housed in a longitudinal row on the first member and disposed in a linear array in side by side point contact and constrained against movement relative to one another, a second member, a transducer carried by said second member, said first and second members being relatively movable in a rectilinear path parallel to the longitudinal row of balls with said members being capable of relative displacement in a direction parallel to the line of point contact of the balls, said transducer comprising means positioned on one side of the balls for producing a periodically varying magnetic field through the balls in a direction extending across the row thereof and perpendicular to the longitudinal line of contact of the balls, and separate means positioned on the other side of said balls for sensing phase-displaced variations produced in the magnetic field by said relative movement of the members and for producing signals denoting the relative positions of the first and second members, said sensing means comprising at least two pick-up coils coupled by mutual inductance only with the signal producing transducer and disposed adjacent to and spaced apart along the row of balls and along the line of contact thereof.

2. A position detector as claimed in claim 1, in which the means for producing a periodically varying magnetic field comprises at least two transmitter coils which are adjacent to and spaced apart along the row of balls, the spacing between adjacent transmitter coils being the same as that between adjacent pick-up coils, each transmitter coil being located directly opposite a respective one of the pick-up coils.

3. A position detector as claimed in claim 2, in which a multiplicity of transmitter coils and pick-up coils are provided, the pick-up coils being located at regular intervals along the row of balls, the length of these intervals being determined by the number of pick-up coils provided.

4. A position detector as claimed in claim 3, in which there is further provided means for supplying, to each transmitter coil, a signal having a periodic waveform, the relationship between the phase of the signals supplied to one transmitter coil and that of the signals supplied to any other transmitter coil being directly related to the relative location of those two transmitter coils along the row of balls.

* * * * *